US007925004B2

(12) United States Patent
Hodges et al.

(10) Patent No.: US 7,925,004 B2
(45) Date of Patent: Apr. 12, 2011

(54) SPEAKERPHONE WITH DOWNFIRING SPEAKER AND DIRECTIONAL MICROPHONES

(75) Inventors: Richard Hodges, Oakland, CA (US); Gordon S. Simmons, Scotts Valley, CA (US)

(73) Assignee: Plantronics, Inc., Santa Cruz, CA (US)

(*) Notice: Subject to any disclaimer, the term of this patent is extended or adjusted under 35 U.S.C. 154(b) by 991 days.

(21) Appl. No.: 11/414,670

(22) Filed: Apr. 27, 2006

(65) Prior Publication Data

US 2007/0263845 A1 Nov. 15, 2007

(51) Int. Cl.
*H04M 1/00* (2006.01)

(52) U.S. Cl. .............................. 379/388.01; 379/420.03

(58) Field of Classification Search .................. 379/419, 379/420.01, 420.02, 420.03, 428.01, 429, 379/431, 432, 434, 435, 436, 387.01, 388.01, 379/388.02

See application file for complete search history.

(56) References Cited

U.S. PATENT DOCUMENTS

| | | | | |
|---|---|---|---|---|
| 4,620,317 | A * | 10/1986 | Anderson | 381/346 |
| 5,121,426 | A | 6/1992 | Baumhauer, Jr. et al. | |
| 5,226,076 | A * | 7/1993 | Baumhauer et al. | 379/420.02 |
| 5,323,458 | A | 6/1994 | Park et al. | |
| 5,664,021 | A | 9/1997 | Chu et al. | |
| 5,715,319 | A * | 2/1998 | Chu | 381/26 |
| 6,016,346 | A | 1/2000 | Rittmueller et al. | |
| 2003/0059061 | A1 * | 3/2003 | Tsuji et al. | 381/92 |
| 2005/0008173 | A1 * | 1/2005 | Suzuki et al. | 381/160 |

* cited by examiner

*Primary Examiner* — Walter F Briney, III

(74) *Attorney, Agent, or Firm* — Donald C. Lawrence; Michael D. Rodriguez

(57) ABSTRACT

A speakerphone having improved echo cancellation and sound output includes at least one directional microphone having at least one axis of sensitivity and at least one zone of insensitivity, and a speaker disposed in the zone of insensitivity of the microphone to radiate sound away from the microphone and towards a reflective surface, such as a desktop or wall, against which the speakerphone is disposed. A baseplate disposed adjacent to the speaker outlet can combine with the housing of the phone to form a flaring, right-angled horn having an inlet coupled to the outlet of the speaker and an outlet terminating at a periphery of the housing. A wall-mounting embodiment incorporates a unidirectional microphone with an axis of sensitivity oriented perpendicular to the wall, and a desktop-mounting embodiment includes an array of at least two bi-directional microphones having respective axes of sensitivity oriented parallel to the desktop.

10 Claims, 6 Drawing Sheets

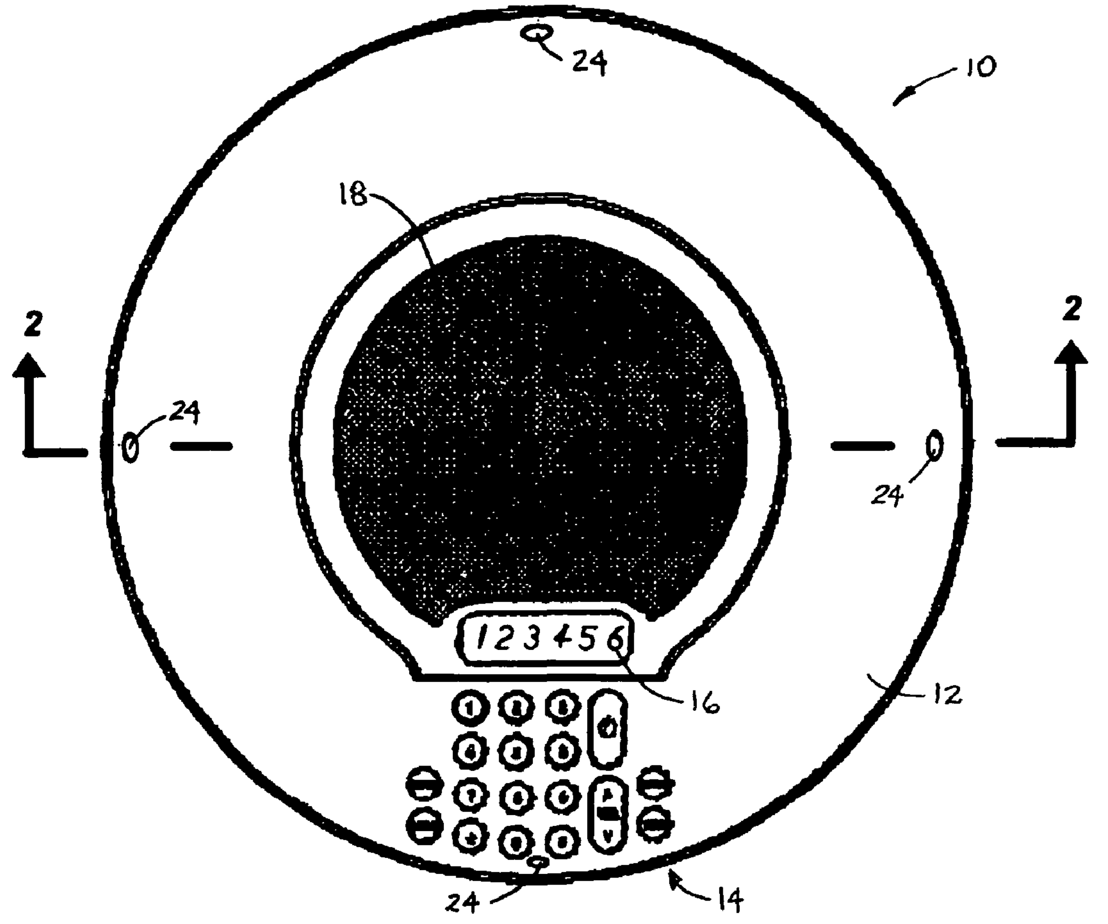
*Fig. 1 - Prior Art*
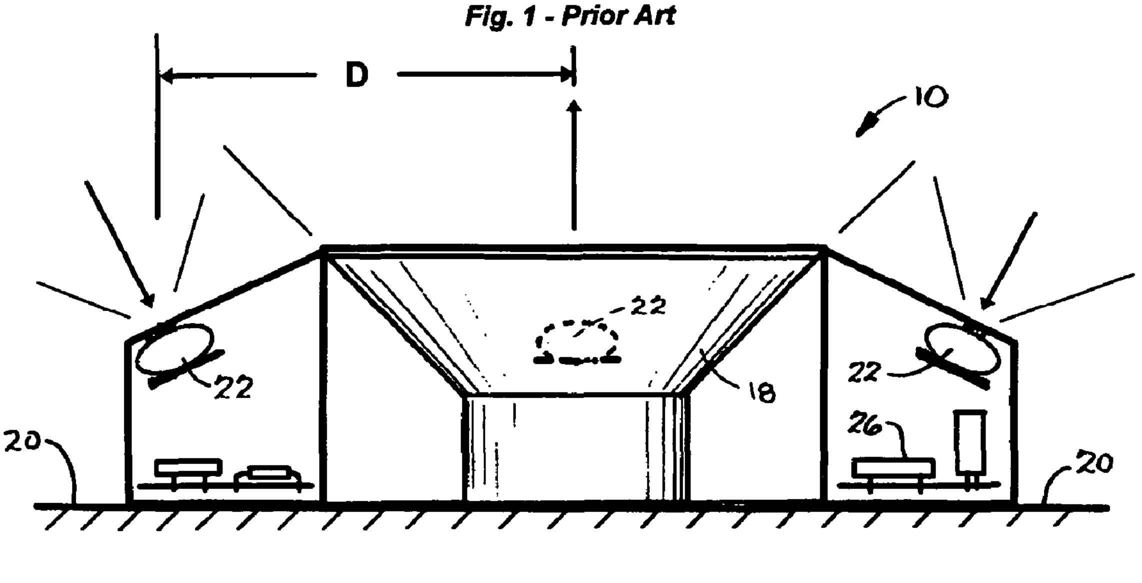
*Fig. 2 - Prior Art*

SPEAKERPHONE WITH DOWNFIRING SPEAKER AND DIRECTIONAL MICROPHONES

TECHNICAL FIELD

This invention relates to the field of telephony in general, and in particular, to a design for a speakerphone that provides full duplex communication with improved echo cancellation and sound reproduction.

BACKGROUND

Because of their hands-free convenience and ability to include more than one conversationalist at either end of a telephone call, speakerphones are currently in widespread use today, both for business and personal communications. Indeed, many low-cost telephone sets sold today have some speakerphone capability built into them. The speaker is often located under the handset, which is not an ideal location for the speaker, but is used to conserve space, and virtually all speakerphones sold today employ a loudspeaker that radiates, or "fires," generally upward and/or forward from the upper or forward-facing surface of the phone. Business conferencing speakerphones are a typical manifestation of a speakerphone in which the speaker points upward, and the one or more microphones of the phone are typically distributed around the periphery of the phone and as far away from the speaker output as is practically possible to minimize the amount of "acoustic echo" manifested by the phone during operation.

All telephone sets can manifest two kinds of echoes, viz., an "acoustic echo" from feedback in the acoustic path between the earphone or speaker of the phone and its microphone, and a "line echo" that originates in the switched network that routes a call between stations. Acoustic echo is typically not a substantial problem in a wired telephone with a handset. However, acoustic feedback is a much greater problem in speakerphones, because both the room in which the phone is located and the contents thereof become part of the audio system and acoustic path from the speaker to the microphone. Accordingly, speakerphones typically incorporate some electronic circuitry adapted either to suppress, cancel, or filter out unwanted acoustic echo during operation. Examples of such echo suppression or cancellation circuitry can be found in, e.g., U.S. Pat. No. 6,711,259 to R. Haimi-Cohen al. and U.S. Pat. No. 6,904,146 to S. Dormer et al., respectively. It would be advantageous if the complexity, and hence, cost, of such circuitry could be substantially reduced, if not completely eliminated.

Additionally, it is desirable to achieve better low-frequency sound definition and high-frequency sound dispersion by the loudspeaker of the phone in order to increase speech intelligibility in teleconferences. This is particularly the case in "wideband" telephone transmissions (i.e., in a frequency band of about between about 150 Hz to about 7200 Hz) to enable users to better discern the vocal characteristics of far-end talkers, and thereby enable them to be easily identified in those instances in which there are many persons engaged in a conference call.

Accordingly, there is a long-felt but as yet unsatisfied need in the field for a speakerphone design that inherently reduces the amount of acoustic echo present in the phone, thereby resulting in the need for less complex, and hence, less costly echo cancellation circuitry, and one that also provides better low-frequency sound definition and high-frequency sound dispersion by the loudspeaker of the phone.

BRIEF SUMMARY

In accordance with the various exemplary embodiments thereof described herein, a full duplex desktop- or wall-mounting speakerphone is provided that has improved echo cancellation, better sound performance and dispersion, and requires a substantially smaller footprint than speakerphones of the prior art.

In one exemplary embodiment thereof, the novel speakerphone comprises a directional microphone, a housing and a loudspeaker arranged within the housing such that the speaker is disposed in a zone of insensitivity of the microphone and radiates sound away from the microphone and towards a surface upon or against which the housing is abutted, such as a desktop or a vertical wall surface. The speaker has a sound radiation axis that is disposed generally perpendicularly to the abutting surface. The speaker can comprise a moving coil speaker, an electrostatic speaker, or a piezoelectric speaker.

The housing may advantageously include a baseplate disposed concentrically adjacent to the outlet of the speaker and generally perpendicularly to its axis of radiation. The baseplate can include an upstanding conical structure disposed concentrically to the radiation axis of the speaker to improve the impedance matching with, and hence, the energy transfer from, the speaker to the ambient air of the room. More advantageously, the baseplate and the housing can together define a flared exponential hom, or "surround," disposed generally perpendicularly to the radiation axis of the speaker that functions to further improve the energy transfer between the speaker and the ambient room, and also to improve the frequency response and radial directionality and dispersion of the sound reproduced by the speaker. The horn can have an outlet that extends around the entire, or at least a substantial portion of, the lateral periphery of the housing for a uniform sound dispersion of the speaker into the room.

The speakerphone further includes at least one directional microphone having at least one axis of sensitivity defining a zone of microphone sensitivity, and at least one axis of insensitivity defining a zone of insensitivity of the microphone, i.e., the microphone is sensitive to sounds originating in its zone(s) of sensitivity, and is insensitive to sounds originating in its zone(s) of insensitivity. The at least one microphone can comprise a dynamic microphone, an electrostatic microphone, including an electret microphone, or a piezoelectric microphone, but in all cases, the speaker of the phone is disposed within a zone of insensitivity of the microphones to minimize acoustic echo in the telephone.

In the case of a wall-mounted speakerphone, the at least one microphone can comprise a unidirectional microphone in which the respective axes of sensitivity and insensitivity are coaxial with each other. In this embodiment, the radiation axis of the speaker is disposed generally along and coaxially with the axis of insensitivity of the microphone and perpendicularly to the generally vertical wall surface against which the housing of the speakerphone is mounted. Alternatively, and depending on the particular application, the axis of sensitivity of the unidirectional microphone can be oriented at an angle of from about 0 degrees, i.e., parallel, to about 90 degrees, i.e., perpendicular, relative to the mounting surface to sense speech from talkers located within a generally hemispherical zone in front of the phone.

In the case of a desktop speakerphone, the at least one microphone can comprise an array of microphones that includes one or more directional microphones having respective, overlapping axes of sensitivity and at least one common, overlapping zone of insensitivity located below the array. In an embodiment incorporating two bidirectional microphones, the respective axes of sensitivity of the microphones are disposed orthogonally to each other and generally parallel to the upward-facing surface of a desk or table upon which the speakerphone housing is disposed. The speaker of the phone is located within the common zone of insensitivity of the microphones, with its axis of radiation disposed generally perpendicularly to the upward-facing surface, so that the speaker radiates, or "fires," downward toward the upward-facing surface and away from the microphone array.

In either the desktop or tabletop embodiments, the respective electrical output signals of the array of microphones corresponding to sound pressure input signals respectively received by the microphones can be electrically combined and/or selectively processed to form a precursor of the signal ultimately transmitted by the speakerphone, and optionally, by using known fixed-beam-forming techniques or adaptive beam-forming algorithms, can be used to automatically select a dominant signal for transmission, e.g., the voice of a user whose voice is dominant at any given moment. In another possible "flush-top" variation, the directional microphones can be disposed below an upper surface of the housing, and the housing provided with a plurality of tubular sound channels, each having an entry end originating at the upper surface of the housing and an exit end terminating adjacent and generally perpendicularly to respective opposite faces of the pressure sensing elements, e.g., the diaphragms, of the microphones.

A better understanding of the above and many other features and advantages of the novel speakerphones of the invention may be obtained from a consideration of the detailed description below of some exemplary embodiments thereof, particularly if such consideration is made in conjunction with the appended drawings, wherein like reference numerals are used to identify like elements illustrated in one or more of the figures therein.

BRIEF DESCRIPTION OF THE DRAWINGS

FIG. 1 is a top plan view of a speakerphone in accordance with the prior art;

FIG. 2 is a cross-sectional elevation view of the prior art speakerphone of FIG. 1, as viewed along the section lines 2-2 therein;

DETAILED DESCRIPTION

Figure 3:
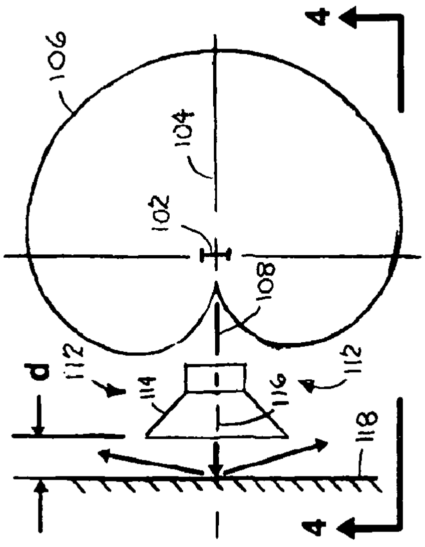
FIG. 3 is a schematic top plan view of a unidirectional, or cardioid microphone, showing a polar sensitivity pattern and a zone of insensitivity thereof, and a loudspeaker disposed behind the microphone and in the zone of insensitivity and radiating sound away from the microphone and toward a generally vertical surface disposed behind the microphone.

A typical speakerphone 10 of the prior art is illustrated in the top plan and cross-sectional side elevation views of FIGS. 1 and 2, respectively. As illustrated in the figures, the conventional speakerphone includes a housing 12, a multi-button set 14 of manually actuated dialing and signaling switches, and a liquid crystal alphanumeric display 16. The phone also comprises a loudspeaker 18 disposed in the housing to radiate sound in a generally upward and/or outward direction relative to a surface 20 against or upon which the phone is disposed in abutment, e.g., the generally vertical surface of a wall, in the case of a wall-mounting speakerphone, or a generally horizontal, upward-facing surface, in the case of a desktop-mounting speakerphone. The conventional speakerphone also includes at least one, and usually a plurality, of microphones 22, which are typically distributed around the periphery of the phone to receive, through small openings 24 in the housing, speech uttered by one or more participants situated in front of or circumferentially around the phone and engaged in a teleconference with one or more far-end conversationalists.

The microphones 22 are typically spaced away from the output of the speaker 18 by a distance D, typically not less than about 12.5-15.0 centimeters ("cm"), that is as far away from the output of the speaker 18 as is practical to minimize the amount of sound coupled from the speaker to the microphones during operation, i.e., acoustic echo. Any delays present in this acoustic feedback path can lead to disconcerting unintelligibility of the signals transmitted by the speakerphone to far-end talkers, and further, if the loop gain in the path exceeds unity, can result in an unstable operation, or "howl," in the phone. Accordingly, most speakerphones today typically also incorporate some form of echo suppression or cancellation circuitry 26, which range from "hard limiter" types of suppressors, that effectively prevent the phone from both receiving and transmitting at the same time, i.e., cause it to operate in a "half-duplex" mode, to more complex echo suppressors and cancellers, which, although allowing the phone to operate in a full duplex mode, can be relatively complex, problematical and hence, expensive, to implement.

However, in accordance with the present invention, a design for a speakerphone has been developed that inherently reduces the amount of acoustic echo present in the phone, thereby enabling the use of less complex, and hence, less costly, echo cancellation circuitry, and one that also provides better low-frequency sound definition and high-frequency sound dispersion by the loudspeaker of the phone, thereby enabling the phone having a smaller speaker, and hence footprint, as described in detail below.

FIG. 3 schematically illustrates a top plan view of a sound-pressure-sensitive element, e.g., a diaphragm, of a conventional unidirectional microphone 102, sometimes referred to as a "cardioid" microphone because of the heart shape of its polar sensitivity pattern. Such a microphone has a single axis of sensitivity 104, a bounded, symmetrical zone of sensitivity, or "polar pattern" 106 surrounding the axis of sensitivity, and an unbounded zone of insensitivity 108 located behind lines 110 (which are tangent to the polar pattern) that is symmetrical about at least one axis of insensitivity 112, which, in the unidirectional embodiment illustrated, is coaxial with the axis of sensitivity of the microphone. That is, the microphone is sensitive to sounds originating in the zone of sensitivity, and is insensitive to sounds originating in the zone of insensitivity. Further, it should be understood that, while the zones of sensitivity 106 and insensitivity 108 of the microphone appear as two-dimensional regions in the top plan view of FIG. 3, they are in fact three-dimensional volumes that are "swept out" by the respective two-dimensional figures when rotated about the respective axes of sensitivity and insensitivity 104 and 106 of the microphone, as illustrated in the elevation view of FIG. 4.

As illustrated in the figures, a loudspeaker 114 having an axis 116 of sound radiation and assumed to function "ideally," i.e., as a point source of sound, is disposed behind the microphone 102 in the microphone's zone of insensitivity 108 such that the speaker radiates sound away from the microphone and toward a relatively hard, generally vertical reflecting surface 118 disposed adjacent to the speaker and microphone combination, such as the surface of a wall on which the combination might be mounted. In the particular embodiment illustrated, the radiation axis of the speaker is disposed generally coaxially with the axis of sensitivity of the microphone, and generally perpendicularly to the upright surface, such that the output end of, e.g., the cone of the speaker, is spaced apart from the reflecting surface by a distance d, which is controlled to be less than half the wavelength of the highest frequency of sound to be reproduced by the speaker, such that the sound waves reflecting from the surface are in phase with and thereby combine additively with those leaving the speaker.

Thus, for a speakerphone operating with the standard telephonic bandwidth of about 300-3300 Hz, the output end of the speaker 114 is preferably spaced apart from the reflecting surface 118 by a distance d of about 2.3 cm, or less, and for a speakerphone operating with an "enhanced" bandwidth of about 150-7200 Hz, the end of the speaker is preferably spaced apart from the surface by a distance of about 13 millimeters ("mm"), or less.

Figure 4:
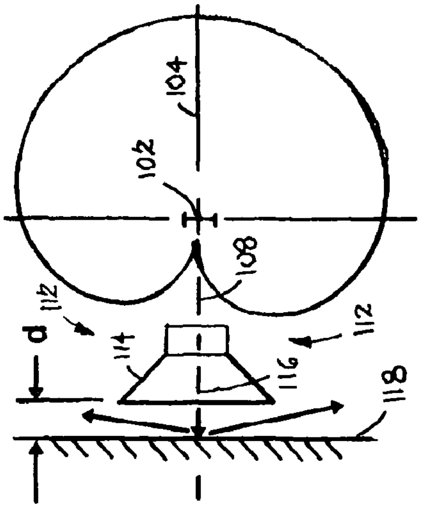
FIG. 4 is a schematic side or elevation view of the unidirectional microphone, speaker and vertical surface of FIG. 3, as viewed along the section lines 4-4 therein.

It has been discovered that, by arranging the speaker 114 of a speakerphone: 1) to reside in the zone of insensitivity 108 of the one or more directional microphones 102 of the phone, and 2) to "fire," or radiate, sound away from the microphone and perpendicularly toward a generally flat, hard, lateral- or upward-facing surface 118 of a wall, table or the like upon which the housing or base portion of the speakerphone is disposed, as illustrated schematically in FIGS. 3 and 4, an attenuation of from about 10-20 dB in the amount of sound coupled from the speaker to the microphone, i.e., in the acoustic echo of the phone, can be obtained over speakerphones of the prior art. Additionally, given that most walls, desks or tables, e.g., a conference table, have top surfaces that are hard, flat and relatively smooth, such an arrangement enables the wall or tabletop surface to be incorporated as part of the speaker acoustics to improve the low frequency response of the phone.

As those of skill in the art will appreciate, the unidirectional microphone 102 and speaker 114 arrangement illustrated in FIGS. 3 and 4 is best adapted to a wall-mounting speakerphone configuration in which the users can be arrayed anywhere within about a hemisphere in front of the phone. However, as illustrated schematically in the alternative arrangement of FIGS. 5 and 6, by rearranging the position of the speaker 114 radiate toward a generally horizontal surface 118, it is also possible to implement the arrangement in a desktop-mounting phone, albeit with a limited range of azimuthal sensitivity.

Figure 6:
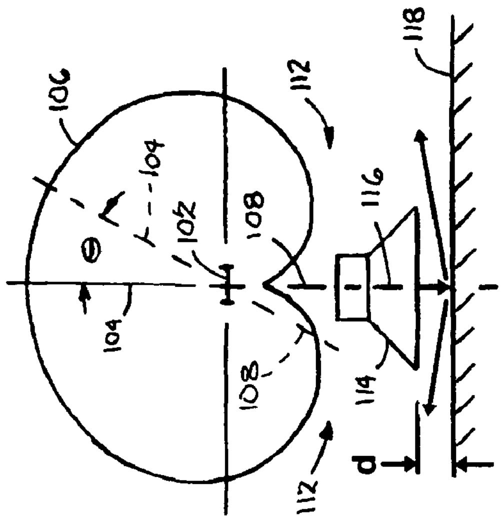
FIG. 6 is a schematic side or elevation view of the unidirectional microphone, speaker and horizontal surface of FIG. 5, as viewed along the section lines 6-6 therein.

As will be understood by reference to FIG. 6, this limitation can be addressed to a certain extent by "rotating" the axis of sensitivity 104 of the microphone 103 downward toward the horizontal, and/or spacing the speaker 114 slightly further away from the microphone such that, while the speaker still resides within the zone of insensitivity 108 of the microphone, with its axis of radiation 116 disposed generally perpendicularly to the upward-facing surface, the axis of maximum sensitivity 104 of the microphone points toward one side of the speakerphone. The axis of sensitivity of the microphone can be oriented at an angle of from about 0 degrees (i.e., perpendicularly, as illustrated in FIGS. 3 and 4) to about 45 degrees relative to the horizontal surface, depending on the particular application at hand. However, as will be appreciated by those of skill in the art, the latter arrangement is better adapted to a desktop-mounting speakerphone in which only a single or few users are situated generally in front of the phone, as the zone of insensitivity 108 of the unidirectional microphone extends around a substantial arc of azimuth behind the phone, and the phone is therefore not adapted to receive sounds from users situated behind the phone.

Figure 5:
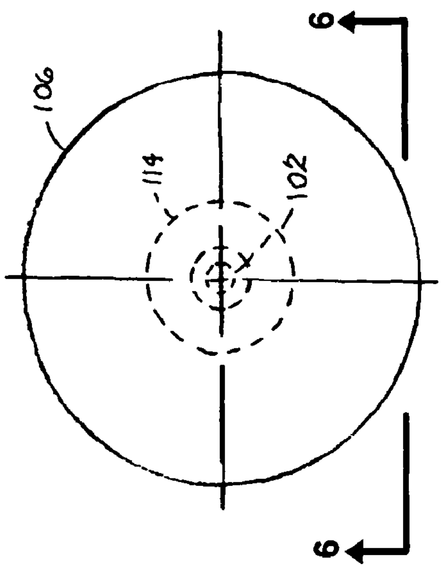
FIG. 5 is a schematic top plan view of another unidirectional microphone, showing the polar sensitivity pattern and zone of insensitivity thereof, and a speaker disposed below the microphone in the zone of insensitivity and radiating sound away from the microphone and toward a generally horizontal surface disposed below the microphone.
Figure 8:
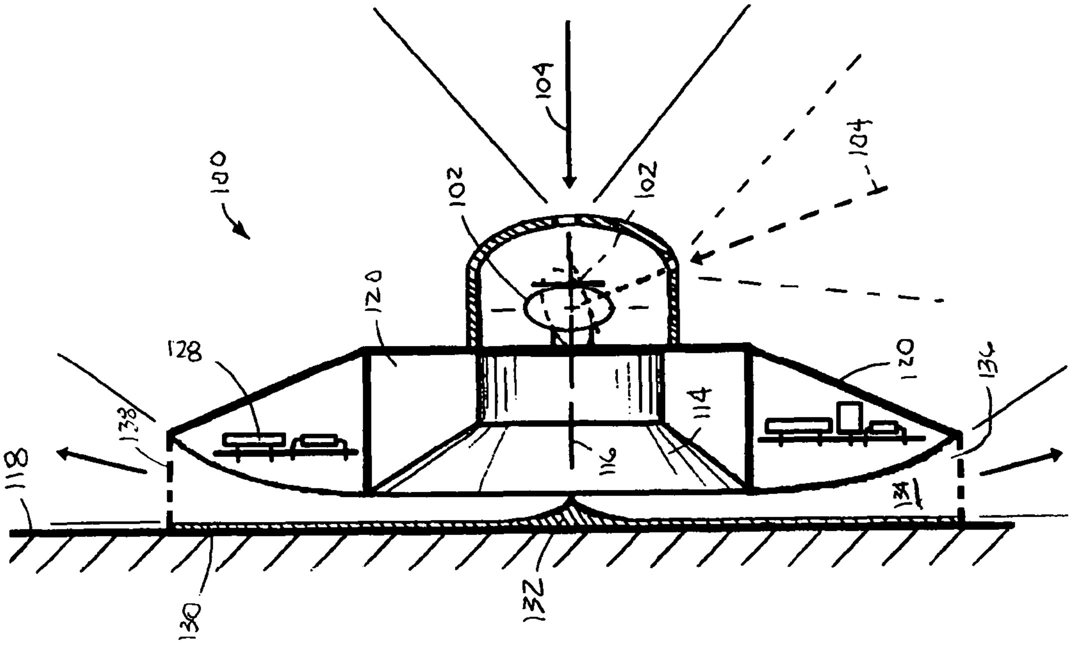
FIG. 8 is a cross-sectional elevation view of the novel speakerphone of FIG. 7, as viewed along the section lines 8-8 therein, showing the speakerphone mounted against either a generally vertical or a generally horizontal surface.
Figure 7:
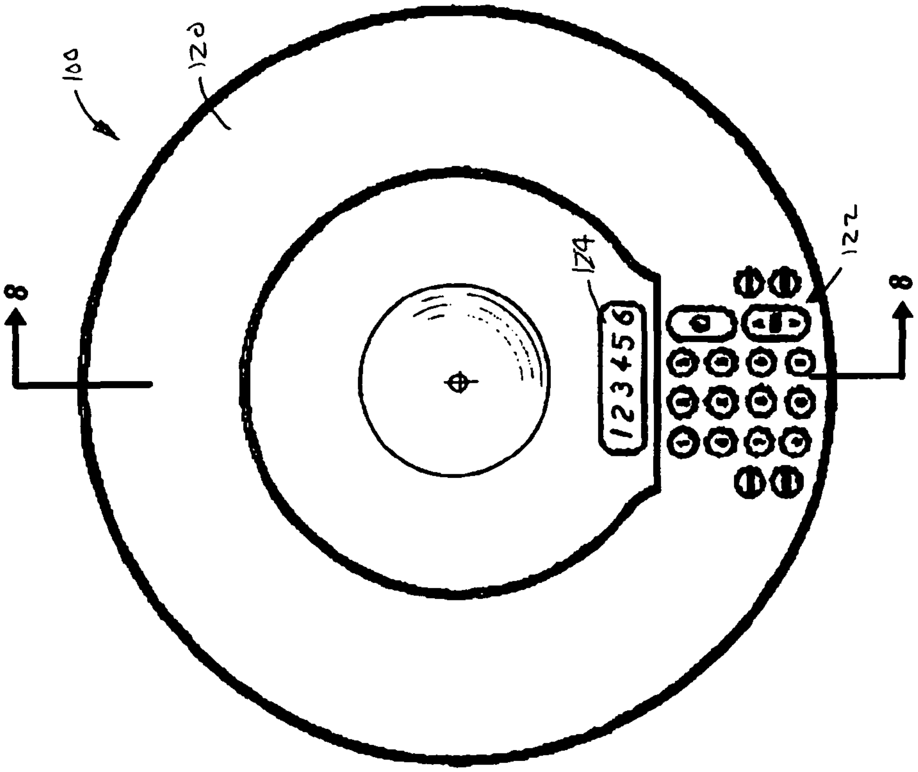
FIG. 7 is a top plan view of an exemplary embodiment of a speakerphone in accordance with the present invention.

An exemplary embodiment of a wall- or desktop-mounting speakerphone 100 incorporating the respective microphone 102 and speaker 114 arrangements of FIGS. 3-6, is illustrated in the top plan and cross-sectional elevation views of FIGS. 7 and 8, wherein the alternative, desktop-mounting arrangement of FIGS. 5 and 6 is shown in dashed lines. In addition to the unidirectional microphone 102 and speaker 114, the phone also includes a housing 120, a multi-button set 122 of manually actuated dialing and signaling switches, and, e.g., a liquid crystal alphanumeric display 124.

As illustrated in FIG. 8, the microphone 102 of the speakerphone 100 shown by solid lines comprises a unidirectional microphone having its axis of sensitivity 104 oriented perpendicularly, i.e., at an angle of 0 degrees, relative to the generally vertical wall surface 118 against which the wall-mounting housing 120 abuts, corresponding to the arrangement shown schematically in FIGS. 3 and 4. The alternative microphone 102 shown by the dashed lines comprises a unidirectional microphone having its axis of sensitivity 104 oriented at an angle of from about 0 to about 45 degrees relative to a generally horizontal, upward-facing desktop surface 118 upon which the housing is disposed, corresponding to the arrangement shown schematically in FIGS. 5 and 6. The microphone can comprise a conventional dynamic microphone, an electrostatic microphone, an electret microphone or a piezoelectric microphone. Of importance, in both embodiments, the speaker 114 resides within the zone of insensitivity 108 of the microphone, with its axis of radiation 116 disposed generally perpendicularly to the abutting surface 118 and coaxially with at least one axis of insensitivity 112 of the microphone. The speaker can comprise a conventional moving coil speaker, an electrostatic speaker, or a piezoelectric speaker.

In some applications in which the 10-20 dB of inherent isolation between the microphone 102 and the speaker 114 provided by the above arrangement is not sufficient to provide good communication, the speakerphone 100 may additionally include echo canceling or suppressing circuitry 132. However, because of the inherent isolation provided by the novel arrangement of microphone and speaker described above, the complexity, and hence, cost of such circuitry, can be substantially reduced.

Another advantageous feature of the speakerphones of the present invention is also illustrated in FIG. 8, viz., mechanisms for improving the energy transfer between the speaker 114 and the surrounding room, and for improving the frequency response and lateral directionality of the sound reproduced by the speaker. In particular, and with reference to FIG. 8, these mechanisms include a baseplate 130 disposed against the abutting wall or tabletop surface 118 and adjacent to the speaker such that the baseplate is generally perpendicular to the radiation axis 116 of the speaker. The baseplate can optionally include an upstanding conical structure 128 that faces the speaker and is concentric to its axis of radiation to further improve the impedance matching, and hence, the energy transferred, from the speaker to the ambient air of the room.

Additionally, the baseplate and the housing 120 can define at least a portion, e.g., a half portion, of a flared horn 134, e.g., an exponential or a "hypex" horn, disposed generally perpendicularly to the radiation axis of the speaker 114 and having an outlet 136 that extends around at least a portion of the lateral periphery of the housing, that functions by means of the "horn loading" effect to further improve the energy transfer between the speaker 114 and the ambient room air, and also to improve the frequency response and the lateral directionality of the sound reproduced by the speaker. In the embodiment illustrated in FIG. 8, the bell, or outlet, of the horn extends around the entire periphery of the speakerphone and is covered by, e.g., a perforated grill 138 or the like.

An additional benefit of the impedance-matching and improved frequency response and sound dispersion mechanism described above is that it also enables the size of the speaker 114, and hence the speakerphone 200 itself, to be reduced substantially, and therefore, enables the provision of a speakerphone having a very small footprint, but with loudspeaker performance of a quality found only in much larger wall-mounting or tabletop speakerphones.

As discussed above, while the exemplary speakerphone 100 embodiment of FIGS. 7 and 8 can function as a desktop-mounting phone, it is not well adapted in that configuration to situations in which a plurality of users are disposed in a generally circular arrangement surrounding the phone, because, as discussed above, the zone of insensitivity 108 of the unidirectional microphone extends around a substantial arc of azimuth behind the phone, and the phone is therefore not adapted to receive sounds from users located within this zone. However, a desktop-mounting speakerphone 200 that overcomes this limitation in accordance with the present invention can be easily provided, in the manner described below.

Figure 9:
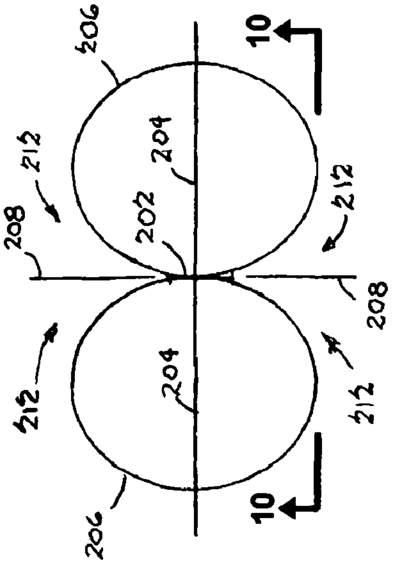
FIG. 9 is a schematic top plan view of a bidirectional, or FIG. 8 microphone, showing a polar sensitivity pattern and zones of insensitivity thereof.
Figure 10:
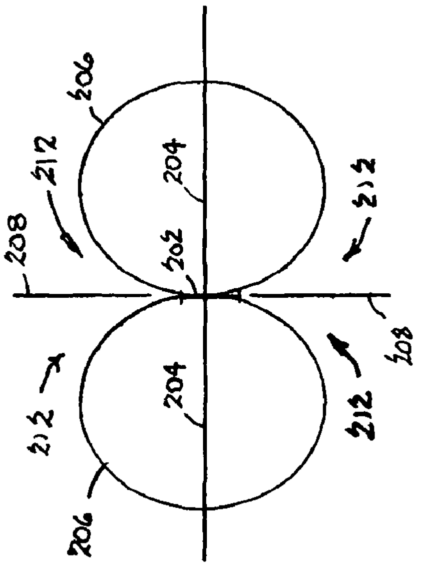
FIG. 10 is a schematic elevation view of the bidirectional microphone, polar pattern and zones of insensitivity thereof, as viewed along the section lines 4-4 therein.

FIGS. 9 and 10 respectively illustrate top plan and side elevation views of the sound pressure sensing element, such as a diaphragm, of a bidirectional microphone 202, sometimes referred to as a "pressure gradient" or a "Figure 8" microphone, showing an axis of sensitivity 204, polar sensitivity pattern 206, zone of insensitivity 208, and at least one axis of insensitivity 212 thereof. It may be seen that the polar diagrams of FIGS. 9 and 10 have elements substantially similar in shape and arrangement to the unidirectional microphone 102 polar diagrams of FIGS. 3 and 4, and in fact, a bidirectional microphone can be confected by disposing two unidirectional microphones back-to-back, i.e., with their respective axes of sensitivity 104 disposed coaxially with each other and pointing in opposite directions. Thus, it should be understood that, in the embodiments described herein as incorporating a bidirectional microphone, a pair of unidirectional microphones can substituted as a functional equivalent thereof.

Figure 11:
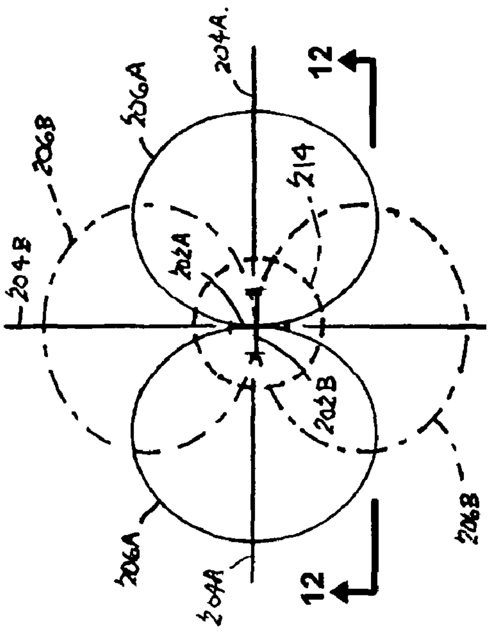
FIG. 11 is a schematic top plan view of a pair of bidirectional microphones, showing respective, overlapping polar sensitivity patterns and common zones of insensitivity thereof, and a speaker disposed below the microphones in a zone of insensitivity thereof and radiating sound away from the microphones and toward a generally horizontal surface disposed below the microphones.
Figure 12:
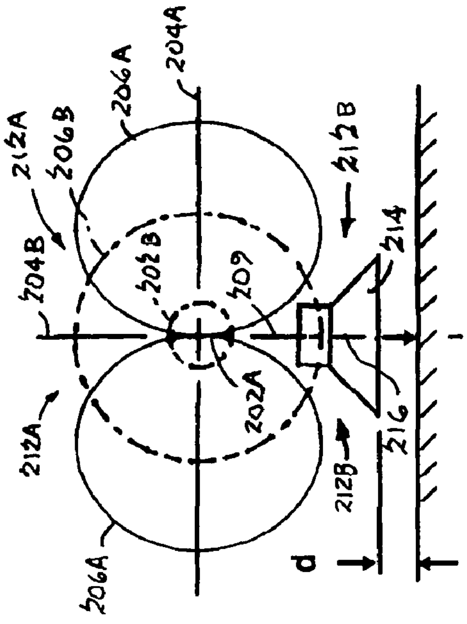
FIG. 12 is a schematic side or elevation view of the bidirectional microphones, speaker and horizontal surface of FIG. 11, as viewed along the section lines 12-12 therein.

It may be noted that, while the bidirectional microphone 202 of FIGS. 9 and 10 adds another "lobe" or zone of lateral sensitivity to a desktop-mounting speakerphone incorporating it, it may be seen by reference to FIG. 9 that there still remain two zones 208 of microphone insensitivity on either side of the microphone, i.e., the microphone is insensitive to sounds originating from those zones. However, as illustrated in the respective top plan and side elevation views of FIGS. 11 and 12, if an "array" of at least two bidirectional microphones 102A and 102B (or alternatively, at least four unidirectional microphones) are disposed adjacent to each other, with their respective axes of sensitivity 204A and 204B disposed mutually orthogonal to each other, then the array of microphones forms an overlapping, 360-degree "panoramic" zone of sensitivity surrounding the respective axes of sensitivity, as well as distinct, upper and a lower zones of insensitivity 208A and 208B, respectively, as illustrated in FIG. 12.

If the respective axes of sensitivity of the microphones 202A and 202B are then disposed parallel to an upward-facing surface 218 of, e.g., a desktop, and a loudspeaker 214 is disposed in the lower zone of insensitivity 204B of the microphone array, with its axis of radiation 216 disposed generally perpendicular to the upward-facing surface, then a microphone and speaker arrangement is provided that is optimized for a desktop-mounting speakerphone and that has the advantages of a downfiring speaker described above, together with a full 360 degree azimuthal sensitivity.

Figure 13:
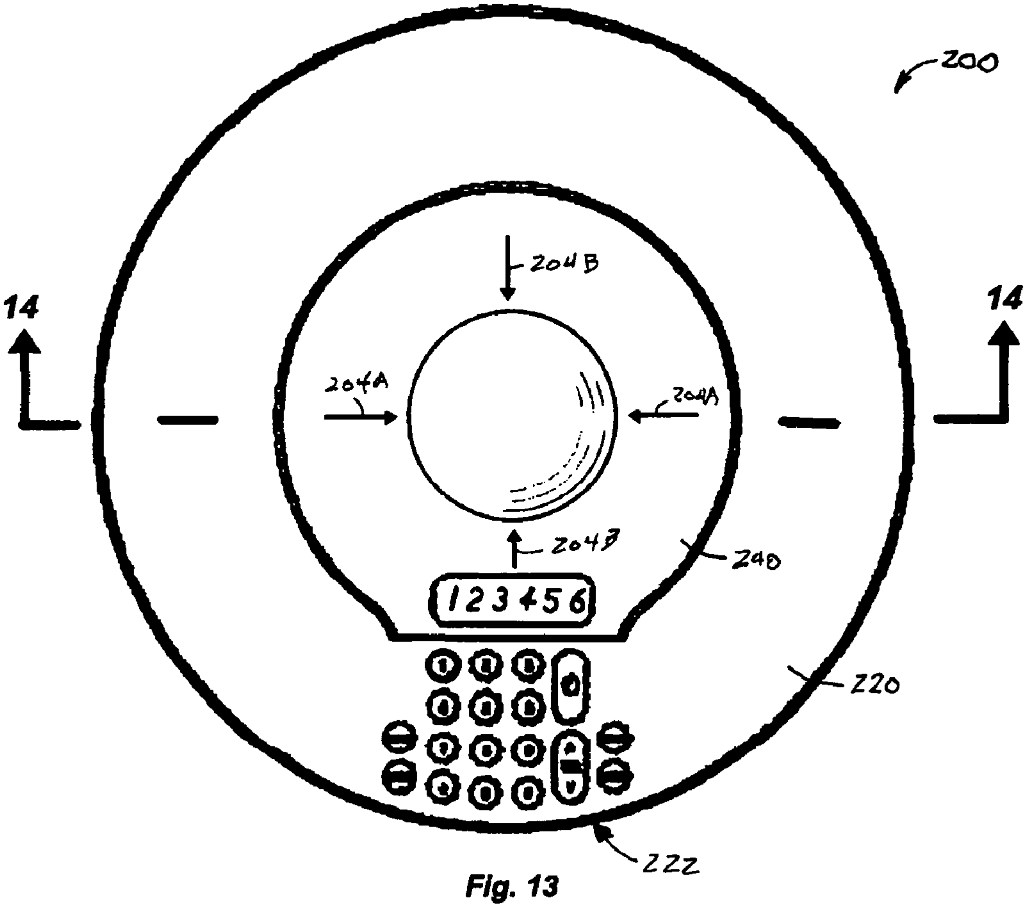
FIG. 13 is a top plan view of another exemplary embodiment of a speakerphone in accordance with the present invention.
Figure 14:
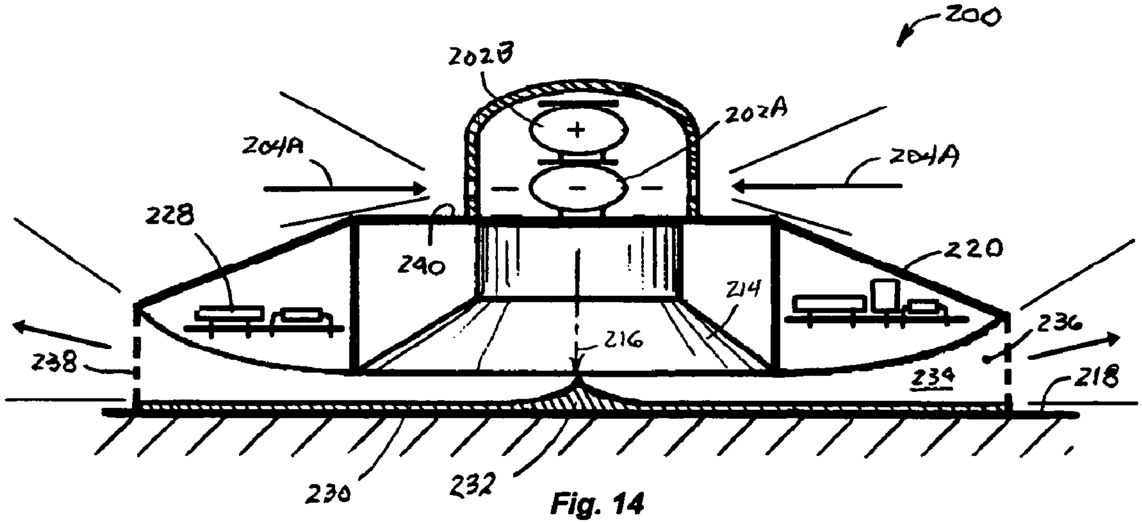
FIG. 14 is a cross-sectional elevation view of the novel speakerphone of FIG. 13, as viewed along the section lines 14-14 therein, showing the speakerphone mounted against a generally horizontal surface.

A second, desktop speakerphone 200 embodiment incorporating such an arrangement is illustrated in the top plan and cross-sectional side elevation views of FIGS. 13 and 14, respectively. In addition to the baseplate 230 and optional flaring horn surround 234 features of the first embodiment of speakerphone 100 described above in connection with FIGS. 7 and 8, the second embodiment includes a microphone array comprising at least two bi-directional microphones 202 A and 202B having respective axes of sensitivity 204A and 204B disposed generally orthogonal to each other and parallel to the abutting desktop surface 218, overlapping zones of sensitivity 206A and 206B, and respective, common upper and lower zones of insensitivity 208A and 208B, as illustrated in FIGS. 11 and 12. As in the first embodiment 100, the speaker 214 is disposed within the lower zone of insensitivity 208B of the microphones, with its axis of radiation 216 disposed generally perpendicularly to the upward-facing surface.

Figure 15:
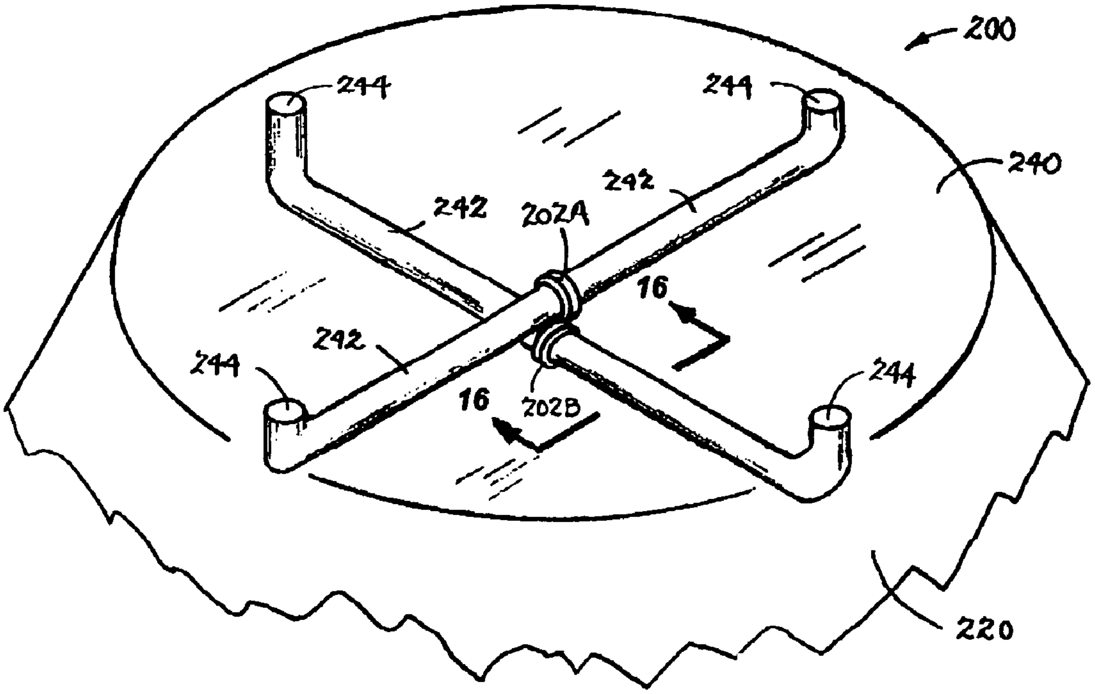
FIG. 15 is a partial schematic isometric view of upper and side surfaces of an alternative embodiment of the speakerphone of FIGS. 13 and 14, showing a plurality of sound channels acoustically coupling openings in the upper surface to opposite faces of respective pressure sensing elements of the microphones and, FIG. 16 is a partial cross-sectional elevation view of the sound channel and microphone arrangement of FIG. 15, as viewed along the section lines 16-16 therein.
Figure 16:
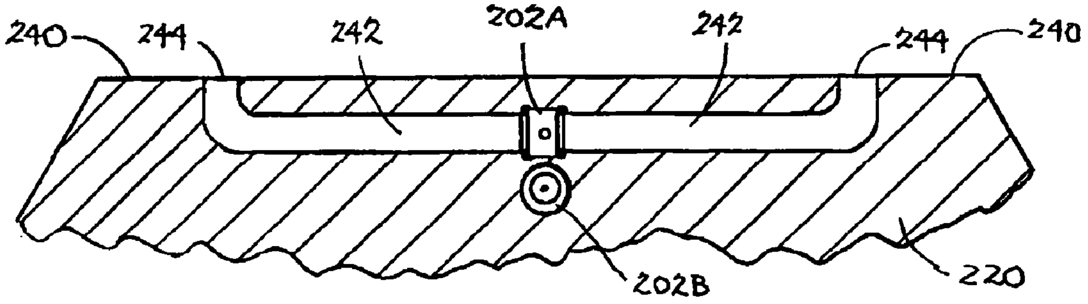

It may be noted that, in the exemplary desktop speakerphone 200 illustrated in FIGS. 13 and 14, the bidirectional microphone(s) 220A and 220B are shown disposed above an upper surface 240 of the main housing 220 of the phone. However, as illustrated in FIGS. 15 and 16, if desired, the microphones can be "hidden," i.e., disposed below the upper surface 240 of the phone, such that the upper surface of the main housing provides a generally flush appearance. This can be effected by providing a plurality of tubular sound channels 242, each having an entry end 244 originating at the upper surface of the housing and an exit end acoustically coupled to respective opposite faces of the pressure sensing elements, e.g., the diaphragms, of the bidirectional microphones, as illustrated in FIG. 15. In the particular embodiment illustrated in FIGS. 15 and 16, the microphone elements are about 9 mm in diameter, and the length of each sound channel from the inlet port to the microphone is controlled to be about 38 mm. However, as those of skill in the art will appreciate, the particular dimensions of such an arrangement can be varied substantially, depending on the particular situation at hand.

In other possible variants of the speakerphone 200, it is possible to combine the output signals of the microphone array with each other electronically, and optionally, with that from a vertically oriented unidirectional microphone (not illustrated) centered in the top surface 240 of the phone, to synthesize, for example, a polar zone of sensitivity having a "null", or zone of insensitivity, below the array and a zone of sensitivity oriented at any desired angle relative to the horizontal to optimize pickup from typical user positions relative to the phone. Such combinations can be implemented with sensitivity zones synthesized using a series of predefined linear combinations of individual directional microphone, or by using known, adaptive-beam-forming signal processing algorithms. In such embodiments, beam-forming by combining microphone signals in predefined directional patterns, coupled with automatic selection of a dominant signal, and/or by using known adaptive beam-forming algorithms, can be employed to ensure that the user whose voice is dominant at any moment is that which is optimally selected for transmission using, e.g., selective voice detection in the signal processing.

It is also possible to use an array of so-called "omnidirectional" or "pressure" microphones that do not have any particular axes of sensitivity or insensitivity, and to use beamforming techniques to synthesize an overall pickup pattern that does have such axes. For example, two omnidirectional microphone elements can be positioned back-to-back above the speaker 214 near the center axis thereof, but offset in opposite directions by a small distance from that axis. Then, if the respective signals picked up by the two microphones are referred to "A" and "B", the signal generated by subtracting the two signals, i.e., A–B, will be substantially similar to that of a conventional bidirectional microphone, and will have a common axis of sensitivity generally perpendicular to the line between the two microphones, thereby specifically including the direction in which the speaker lies. For arrays of at least two microphones, there are generally many different mathematical combinations of their respective signals, as well as the possibility of the application of filtered and time-delayed processing to their signals before combining, that can reject signals coming from a source, such as the speaker, that need to be rejected.

Further, the microphones in such an array need not be omnidirectional but may themselves have directional properties that do not necessarily include the ultimately desired direction(s) of insensitivity. By employing optimal general linear combinations of the signals from multiple microphones of such arrays, a wide variety of patterns of directional and spectral sensitivity can be realized.

For example, a particular special case would employ a bidirectional microphone oriented horizontally, together with a cardioid microphone oriented vertically. Both microphones are thus oriented so that they already have a zone of insensitivity that includes the speaker, and therefore, any linear combination of their signals will also have such a zone; however, certain combinations may have more desirable directional properties than either microphone alone. For example, if the bidirectional microphone signal is labeled "B" and the cardioid signal is "C", the combination B+C will have an optimal pickup axis tilted upward in one azimuth direction and downward in the opposite azimuth; the upward-tilted lobe may be more efficient for sound originating from a typical user whose mouth is disposed above the level of the microphone elements.

Indeed, by now, those of skill in this art will appreciate that many modifications, substitutions and variations can be made in and to the materials, apparatus, configurations and methods of the speakerphone embodiments of the present invention without departing from its spirit and scope. Accordingly, the scope of the present invention should not be seen as limited to the particular embodiments illustrated and described herein, as they are merely exemplary in nature, but rather, should be fully commensurate with that of the claims appended hereafter and their functional equivalents.

What is claimed is:

1. A speakerphone, comprising:

a housing;

at least one microphone;

a speaker arranged within the housing such that the speaker is disposed in a zone of insensitivity of the at least one microphone and radiates sound along a radiation axis away from the at least one microphone and towards a surface against which the housing abuts;

wherein the sound radiation axis of the speaker is disposed generally perpendicularly to the abutting surface;

wherein the at least one microphone comprises at least two bi-directional microphones having respective axes of maximum sensitivity disposed generally orthogonal to each other and parallel to the abutting surface;

wherein the speaker resides in a common lower zone of insensitivity of the at least two microphones;

wherein the bi-directional microphones are disposed below an upper surface of the housing; and wherein the housing includes a plurality of tubular sound channels, each having an entry end originating at the upper surface of the housing and an exit end acoustically coupled to a respective opposite face of a pressure sensing element of one of the microphones.

2. The speakerphone of claim 1, wherein the at least one microphone comprises a dynamic microphone, an electrostatic microphone, an electret microphone or a piezoelectric microphone.

3. The speakerphone of claim 1, wherein the speaker comprises a moving coil speaker, an electrostatic speaker, or a piezoelectric speaker.

4. The speakerphone of claim 1, wherein an outlet end of the speaker is spaced apart from the surface by a distance that is less than about half the wavelength of the highest frequency of sound produced by the speaker.

5. The speakerphone of claim 1, wherein:

the housing includes a baseplate in abutment with the surface, the baseplate being disposed concentrically with and adjacent to the speaker, and perpendicular to the radiation axis of the speaker.

6. The speakerphone of claim 5, wherein the baseplate includes an upstanding hyper-conical structure facing toward the speaker and disposed concentrically to the radiation axis of the speaker.

7. The speakerphone of claim 5, wherein the baseplate and the housing define at least a portion of a flared horn disposed generally perpendicularly to the radiation axis of the speaker.

8. The speakerphone of claim 7, wherein the horn has an outlet that extends around at least a portion of a lateral periphery of the housing.

9. The speakerphone of claim 1, wherein electrical output signals of the microphones corresponding to sound pressure input signals received by the microphones are electrically combined to form at least a precursor of a signal transmitted by the speakerphone.

10. The speakerphone of claim 1, further comprising echo cancellation circuitry disposed in the housing and operative to cancel acoustic echo from a path extending between the speaker and the at least one microphone.

* * * * *